(12) United States Patent
Thomas et al.

(10) Patent No.: US 7,263,028 B2
(45) Date of Patent: Aug. 28, 2007

(54) COMPOSITE ACOUSTIC ATTENUATION MATERIALS

(75) Inventors: Gerald B. Thomas, Pensacola, FL (US); Paul R. Van Dyke, Fort Myers, FL (US); Bruce Guy, Pensacola, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/956,529

(22) Filed: Oct. 1, 2004

(65) Prior Publication Data

US 2006/0072372 A1  Apr. 6, 2006

Related U.S. Application Data

(60) Provisional application No. 60/509,525, filed on Oct. 9, 2003.

(51) Int. Cl.
*G10K 11/16* (2006.01)
*E04B 1/82* (2006.01)

(52) U.S. Cl. .......................... 367/1; 181/284; 181/290
(58) Field of Classification Search ................ 367/1; 181/284, 290

See application file for complete search history.

(56) References Cited

U.S. PATENT DOCUMENTS

| 5,400,296 | A | | 3/1995 | Cushman et al. |
| 5,622,662 | A | * | 4/1997 | Veiga et al. ............... 264/45.3 |
| 5,706,249 | A | | 1/1998 | Cushman |
| 5,745,434 | A | | 4/1998 | Cushman |
| 5,754,491 | A | | 5/1998 | Cushman |
| 5,920,911 | A | | 7/1999 | Cushman |
| 2005/0038160 | A1 | * | 2/2005 | Hall et al. .................. 524/300 |

* cited by examiner

*Primary Examiner*—Ian J. Lobo
(74) *Attorney, Agent, or Firm*—Albert M. Churilla; Joseph K. Hemby

(57) ABSTRACT

The present invention provides means of enhancing the acoustic attenuation and vibration damping of a material by (1) embedding a plurality of small particles of either a high characteristic acoustic impedance or a low characteristic acoustic impedance or combinations of high and low characteristic acoustic impedance materials to form a matrix material to act as a acoustic attenuator or vibration damper; and (2) combing this matrix material with a second layer of a decoupling material that serves to effectively isolate the matrix material and reduce its tendency to vibrate sympathetically to the impinging acoustic energy. The mass of the resultant material may be very low while retaining excellent acoustic attenuation, vibration damping, and structural characteristics.

28 Claims, 6 Drawing Sheets

COMPOSITE ACOUSTIC ATTENUATION MATERIALS

RELATED APPLICATIONS

The instant application claims the benefit of Provisional Application No. 60/509,525, filed Oct. 9, 2003.

BACKGROUND OF THE INVENTION

1. Field of Invention

The present invention relates generally to acoustic attenuation and vibration damping materials. More specifically, the invention provides a two-ply or greater composite acoustic attenuation and vibration damping material intended to be placed between acoustic and/or vibratory energy sources and acoustic and/or vibration protected areas.

2. Description of the Related Art

Within the field of noise control, absorptive techniques are typically utilized to prevent or reduce air-borne acoustic energy from reaching a receiving site. Similarly, vibration-damping techniques are usually applied in close contact with the vibrating structure to prevent or reduce air-borne or structure-borne energy from propagating to the protected area. Both techniques utilize internal damping of impinging acoustic energy as an important means of reducing energy levels and therefore share basic principles. A general review of the art in this area is available from "Material Damping and Slip Damping" by L. E. Goodman (Shock & Vibration Handbook (3rd ed.), Cyril M. Harris (ed.), 1987) and from "Sound-Absorptive Materials" by Ron Moulder (Handbook of Acoustical Measurements and Noise Control (3rd ed.), Cyril M. Harris (ed.), 1991), but a brief overview follows.

Currently available materials capable of absorbing unwanted acoustic energy (i.e., noise) are most effective at frequencies above 500 Hz. Noise attenuation rapidly worsens as lower frequencies are encountered with the result being that few material manufacturers even report attenuation values below 125 Hz.

Most sound absorptive materials, such as foams, felts, etc., are highly porous in structure with the pores intercommunicating throughout the material. The pores may be formed by interconnected solid bubbles or by interstices between small granules. The pores may also be inherent in naturally porous fibrous materials, such as fiberglass. The amplitude of sound waves entering the porous material is reduced through friction between the air molecules and the surfaces of the pores. These materials tend to be light in weight and most effective at shorter wavelengths (i.e., higher frequencies). Unless these porous materials form part of a layered, or constrained, composite with a denser, less porous material, their structural strength is limited.

In order to attenuate lower frequencies, absorptive materials are usually combined with a rigid material with an air space separating the two materials. The amount of low frequency attenuation is directly related to the size of this air space. This approach of combining a sound absorptive material with a rigid material and a separating air space increases both the overall weight and thickness of the resulting sound attenuating structure and therefore may not be feasible in a given application. A significant problem with this approach is the fact that many structures must be load bearing as well as sound absorbing, necessitating the inclusion of solid members between rigid materials. These solid members often provide a very good conduit for acoustic energy, thereby partially defeating the structures' sound attenuating properties.

Another approach embodies the "mass law" which applies to a relatively thin, homogeneous, single layer panel. The mass law states that the loss of energy as it transits a barrier is, over a wide frequency range, a function of the surface density of the barrier material and the frequency in question. In general, this transmission loss increases by 6 decibels (dB) for each octave increase in frequency and for each doubling of the mass of the material. Thus, increasing the mass of the material through increases in thickness or density can improve the acoustic barrier for all frequencies including those in the lower portion of the spectrum. This gain in transmission loss is at the cost of added barrier weight.

Materials utilized specifically for vibration damping follow many of the same rules as those in the absorptive class but are, as a general rule, optimized for attenuating the lower frequencies. As a result, many of these materials have higher density and thickness, tending to depend more on the internal damping of energy penetrating the material than upon the "capture" of acoustic energy by way of a porous architecture.

Absorbing or damping unwanted acoustic or vibrational energy involves converting acoustic energy into another form, usually heat. Heat, acoustic or vibrational energies are closely related. At the molecular level, the primary distinction between heat energy and acoustic or vibrational energy lies in the vector direction of molecular displacements. Acoustic and vibrational energy are characterized by molecular displacements with vector directions that are highly correlated, with large numbers of molecules displacing at the same time and in the same direction. Heat in a medium may well have similar or more energy than propagating acoustic or vibrational energy, but the motion of the molecules is in random directions with the mean molecular displacement at any given location being near zero. Thus, to dissipate acoustic or vibrational energy as heat involves mechanisms that de-correlate molecular movements into random directions.

Several techniques are available for de-correlating molecular movements into random directions. For example, Cushman, et al. (U.S. Pat. No. 5,400,296, incorporated by reference in its entirety herein) teaches the use of two or more species of particles with differing characteristic acoustic impedances embedded in a matrix material. Within the matrix material reflections at boundaries with higher impedance particles are in phase, and reflections at boundaries with lower impedance particles are out of phase. Reflections with different phase relationships at or near the same locale increase the probability of phase cancellations. Phase cancellations de-correlate molecular movements into random directions. However, overdriving an impedance mismatch can result in harmonic distortions that reduce or negate the attenuating properties of the material.

A second approach to de-correlating molecular movements involves the careful choice of matrix materials that exhibit a high degree of internal hysteresis. Propagating acoustic or vibrational energy may boost a particular molecule into a higher energy level, thus subtracting that energy from propagating energy, where the molecule remains for some time before randomly returning to its original energy level. For a discussion of this effect, see Hartmann and Jarzynski, "Ultrasonic hysteresis absorption in polymers," J. Appl. Phys., Vol. 43, No. 11, November 1972, 4304-4312.

A third potential method for redirecting the molecular movements of acoustic or vibrational energy is to convert this energy into electricity using the piezoelectric effect, and to dissipate it as heat through resistive heating.

In addition to the various techniques for increasing acoustic absorption or vibration damping within a material, the shape of a material conducting acoustic or vibratory energy can be made to redirect acoustic energy in harmless directions or to promote viscous damping at an interface. Porous outer layers can be very advantageous. They may promote viscous damping within the interfacing medium, provide a larger surface area with the interfacing medium, and may act as phase shifters by exploiting the fact that the speed of sound in solid materials is much higher than in a gas.

It can be shown experimentally that thin panel sections with very good barrier capability are possible using the techniques described in Cushman, et al (U.S. Pat. No. 5,400,296). However, these panels are not immune to the laws of mechanics and when thin panel sections are attempted, the entire panel will simply follow Newton's well known relationship, F=ma. That is, the entire panel will move over in response to a pressure wave and act as a diaphragm on the opposite surface, thus re-creating the original pressure wave. Very little energy will enter the material where it may be dissipated. The only effective ways to prevent movement of thin sections in response to acoustic pressure are to a) increase the mass of the panel, b) to design the structure to optimize the stiffness of the panel against its support, and c) to reduce the resistance of the panel to incoming pressure waves by making it discontinuous. In many applications, increasing the mass of a barrier structure is not desirable, but increasing the stiffness is acceptable as is decreasing the resistance of the panel by making it discontinuous. A discontinuous panel is a good absorber but is not a good barrier. It may, however, be attached to a barrier panel and the combination provide benefits that neither can provide alone.

SUMMARY OF THE INVENTION

Accordingly, an object of the instant invention is to provide an improved method for enhancing the acoustic attenuation and vibration damping of materials.

Another object of the instant invention is to provide an improved two or greater-ply composite acoustic attenuation and vibration damping material with superior structural capability.

A further object of the instant invention is to provide an improved two or greater-ply composite acoustic attenuation and vibration damping material that is light in weight.

These and additional objects of the invention are accomplished by: (1) embedding a plurality of small particles of either a high characteristic acoustic impedance or a low characteristic acoustic impedance or combinations of high and low characteristic acoustic impedance materials to form a matrix material to act as a acoustic attenuator or vibration damper; and (2) combing this matrix material with a second layer of a decoupling material that serves to effectively isolate the matrix material and reduce its tendency to vibrate sympathetically to the impinging acoustic energy.

BRIEF DESCRIPTION OF THE DRAWINGS

A more complete appreciation of the invention will be readily obtained by reference to the 'Detailed Description of the Preferred Embodiments' and these drawings. Please note that like numerals in different figures represent the same structures or elements. The representation in each of the figures is diagrammatic and no attempt is made to indicate actual scales or precise ratios. Proportional relationships are shown as approximations.

DETAILED DESCRIPTION OF THE PREFERRED EMBODIMENTS

Figure 1:
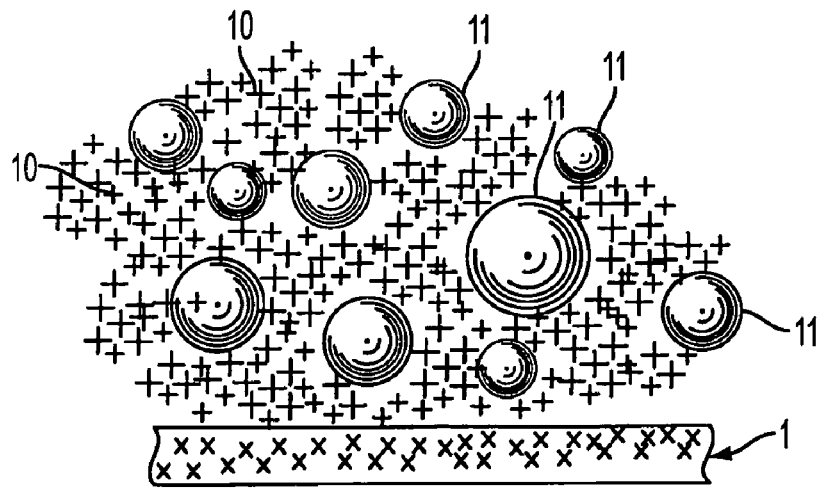
FIG. 1 shows a matrix material of the instant invention with a plurality of embedded low characteristic acoustic impedance particles.

Numerous methods exist for control of acoustic noise and vibration ranging from simple, passive barrier and damping techniques to more sophisticated electronic noise canceling approaches. These methods may target the noise or vibration source, the transmission path, the receiving site, or all of the preceding in combination. The instant invention is of the barrier class and utilizes a composite material composed of a matrix material containing filler particles with high and/or low characteristic acoustic impedances in combination with a second layer of a decoupling material designed to effectively isolate and reduce the tendency to vibrate sympathetically to the impinging acoustical energy. The result of this combination is a composite material that provides improved sound attenuation, vibration damping, and weight characteristics. Through careful selection of matrix material, filler particles, and decoupling layer material, the present invention creates a two-ply composite material with an optimal balance of sound and vibration attenuation, weight, strength, temperature characteristics, and durometer.

The preferred embodiments of the present invention can be briefly summarized as follows: a two-ply acoustic attenuation and vibration damping material that has two layers that are made up of (1) a first layer of a matrix material with a plurality of at least two species of particles incorporated therein, these particles being species differentiated by their characteristic acoustic impedances, and the particle species being proportionally distributed in the matrix material so that an increase in acoustic attenuating and vibration damping effect of the matrix material with the combination of at least two species of particles incorporated therein, relative to the acoustic attenuating and vibration damping effect of the matrix material with no particles incorporated therein, is greater than the sum of increases in acoustic attenuating and vibration damping effects of each particle species incorporated individually at the same concentration in the matrix material, relative to the acoustic attenuating and vibration damping effect of the matrix material with no particles incorporated therein, and (2) a second layer of decoupling material that is at least partially in physical contact with, and attached to, the first layer.

The function of a two or greater-ply acoustic attenuation and vibration damping material of the present invention is best when there is minimal physical contact between the first layer and said second layer and/or the vibrational surface (e.g. wall, floor, etc), for example, less than ten percent of the surface area of the first layer or surface contact. The second layer of decoupling material is generally composed of a random, open-weave, low-density mat. This mat can be made of many different materials but a polyester type material with flame-retardant qualities has been found to be very effective. The mat could also be made of a urethane type material, silicone rubber, other synthetic materials, or even natural materials that could be made into an open-weave/low-density construction. The matrix material could be composed of many synthetic and natural materials including: elastomers, polymers, petroleum extracts, and gypsum. The particle species embedded in the matrix material can likewise be made from many different materials including steel, glass micro spheres, and cork.

The parts indicated on the drawings by numerals are identified as follows below to assist the reader's understanding of the present invention:

1=second layer of decoupling material:
10=Matrix material;
11=Low characteristic acoustic impedance particles;
12=High characteristic acoustic impedance particles;
13=Commercial acoustic absorption material;
14=Commercial acoustic absorption material;
15=Dow Coming RTM. Silastic.RTM. K RTV silicone rubber;
16=Dow Coming.RTM. Silastic.RTM. T RTV silicone rubber;
17=Devcon.RTM. Flexane.RTM. 80 Liquid urethane;
18=Silastic.RTM. T RTV silicone rubber with 4.0% by weight embedded glass micro spheres with diameters ranging from roughly 10 to roughly 100 microns and 48.0% embedded 99% pure lead particles, diameters ranging from roughly 5 to 100 microns;
19=Devcon.RTM. Flexane.RTM. 94 Liquid urethane;
20=Devcon.RTM. Flexane.RTM. 94 Liquid urethane, 3.3% embedded glass micro spheres with diameters ranging from roughly 10 to 100 microns and 33.8% embedded 99% pure lead particles, diameters ranging from roughly 5 to 100 microns;
21=Attenuation curve for 253.3 Hz;
22=Attenuation curve for 125.1 Hz;
23=Attenuation curve for 33.3 Hz;
24=Attenuation curve for 61.0 Hz;
25=Attenuation curve for 253.3 Hz;
26=Attenuation curve for 125.1 Hz;
27=Attenuation curve for 33.3 Hz;
28=Attenuation curve for 61.0 Hz;
29=Dow Coming.RTM. Silastic.RTM. T RTV silicone rubber with 50% by weight embedded 99% pure lead with diameters ranging from roughly 5 to 100 microns;
30=Dow Coming.RTM. Silastic.RTM. T RTV silicone rubber with 7.5% by weight embedded glass micro spheres, diameter ranging from roughly 10 to 100 microns;
31=Attenuation curve for 33.6 Hz;
32=Attenuation curve for 61.0 Hz;
33=Attenuation curve for 125.1 Hz;
34=Attenuation curve for 253.3 Hz;
35=Attenuation curve for 33.6 Hz;
36=Attenuation curve for 61.0 Hz;
37=Attenuation curve for 125.1 Hz;
38=Attenuation curve for 253.3 Hz;
39=Devcon.RTM. Flexane.RTM. 94 Liquid urethane with 5% by weight embedded glass micro spheres with diameters ranging from roughly 10 to 100 microns;
40=Devcon.RTM. Flexane.RTM. 94 Liquid urethane with 50% by weight embedded 99% pure lead particles, diameters ranging from roughly 5 to 100 microns.

The instant invention presents a method of modifying the internal acoustic and vibration transmission characteristics of a material by: (1) placing within that material a plurality of particles of low characteristic acoustic impedance material, of high characteristic acoustic impedance material, or a combination of low and high characteristic acoustic impedance materials; and (2) placing an isolating (or decoupling) layer in tandem with that substrate material to reduce its tendency to vibrate sympathetically to the impinging acoustical energy. The terms "high characteristic acoustic impedance" and "low characteristic acoustic impedance" refer to characteristic acoustic impedances relative to the characteristic acoustic impedance of the substrate or "matrix" material.

Three physical phenomena can account for nearly all acoustic or vibratory attenuation when sound or vibration travels from one area to another through any medium or combination of media. These physical processes are described below in order to gain a better understanding of the present invention and how it overcomes obstacles associated with the prior art.

Acoustic Impedance Mismatches: Characteristic acoustic impedance mismatches always cause some portion of the impinging acoustic or vibratory energy to be reflected, thus attenuating that portion transmitted past the mismatched boundary. There are three general cases for acoustic energy transmission across a boundary: 1) the characteristic acoustic impedance of the first material is lower than the second material; 2) the two impedances match; 3) the characteristic acoustic impedance of the first material is higher than the second material. An example of the first case would be an acoustic pressure wave propagating in air that encounters a steel wall. If the steel is infinitely "hard" (infinitely high characteristic acoustic impedance), then the particle velocity produced by the acoustic pressure wave in the air immediately adjacent to the steel wall is zero, and pressure waves impacting the wall will be rebounded intact and in phase. Pressure doubling can occur in this situation. A softer wall "gives way" under the influence of incoming pressure waves (the characteristic acoustic impedance is lower) and a smaller proportion of the incoming acoustic energy is reflected; the remainder is transmitted past the boundary into the medium of the wall.

In the second case, where the characteristic acoustic impedance of the initial medium and the wall is matched, there is no reflected energy and the acoustic signal continues to propagate in its initial direction.

An example of the third case is an acoustic pressure wave traveling in a large block of steel to a boundary with vacuum (a very low characteristic acoustic impedance). In this case the particle velocity at the wall is precipitously unrestricted by the boundary and increases within the limits of the strength of the material, thus giving rise to a rarefaction wave traveling in the reflected direction. A rarefaction wave is a phase inverted pressure wave. In the case where reflected but phase inverted acoustic energy directly mixes with incoming energy, cancellation can take place.

Friction: In all cases where acoustic or vibratory energy is propagated within or between media there is actual displacement of the boundary and the molecules within the media. Physical displacement generally produces friction, and the energy loss due to friction is subtracted from the propagating acoustic energy. When a material has a high characteristic internal friction it has a high "damping factor" because more energy is converted into heat.

Energy Propagation Modality Changes: Gasses and liquids cannot support shear loads and always propagate acoustic energy in a simple mode with the wave-front perpendicular to the direction of travel. On the other hand, solids can propagate acoustic energy in various modalities including as torsion waves, transverse waves, compression waves and simultaneous combinations of all these. This property makes predicting the behavior of a particular acoustic wave in a solid difficult. However, if a propagating acoustic or vibratory pressure wave traveling in a direct line through some medium can be locally redirected within that medium, even slightly, then the probability that that propagating acoustic energy remains in phase with and mutually supportive of propagating acoustic energy at adjacent locations is diminished.

From an acoustic point of view, liquids and gasses behave differently than solids. If the medium through which an acoustic pressure wave is traveling is a liquid or gas, an encounter with a localized impedance mismatch such as a particle of a different material will cause a localized reflection. The medium cannot support shear loads so none of the reflected energy can be redirected into other modes of travel. Some attenuation will occur. On the other hand, if the transmitting medium is a solid and a particle with a different characteristic acoustic impedance is encountered, then an opportunity arises for the mode of propagation to be transformed into another form. Changing the mode of propagation from, for example, a simple mode into a transverse wave increases the probability of dissipating energy with friction or phase cancellation. The transverse wave thus created is quite unlikely to be in phase with similar energy from adjacent locations. This point of view suggests the somewhat counterintuitive notions: (1) the more "liquid-like" a material is the poorer its attenuation is likely to be if the attenuation mode being exploited is based upon localized impedance mismatches and (2) the weight of the particles being used has little relevance for the effectiveness of attenuation achieved; the predominant factor is the relative degree of impedance mismatch. It is not usually appreciated, for example, that both brass and steel have higher characteristic impedances than lead, and may be better choices in some applications. In all cases the internal damping characteristic of the material used is of paramount importance, as it is ultimately friction that always accounts for acoustic energy dissipation.

The composite material of the present invention incorporates and is based on the impedance mismatching approach described above and patented in U.S. Pat. No. 5,400,296 by the United States Navy, assignee of that patent and the present application. The present invention applies that patent's technology to a combination of that light-weight base matrix, generally a polymer (e.g. polyester), that includes high- and low-characteristic acoustic impedance particles with flame-retardant qualities with an additional decoupling layer(s) to reduce passive radiation of the matrix, isolate the matrix from vibrating substrates, and increase the matrix's flexibility.

In large surface applications, however, the very light weight of the material allows it to vibrate in sympathy with the impinging acoustical wave and it, in effect, can become a passive radiator of the acoustical energy, even when some types of decoupling layers are incorporated in the design. Similarly, anchoring the lightweight sheet with studs or spacers can permit energy transmission.

As stated, the present invention utilizes a second layer of material to effectively isolate and reduce the tendency of the matrix layer to vibrate sympathetically to the impinging acoustical energy. This layer may be planar and uniformly cover the substrate composite matrix or may take the form of random applications of isolating material in order to inhibit the tendency for whole sheet vibration, thereby shortening the effective wavelengths of the sheet vibrations and raising the natural resonance of the sheet to levels more easily attenuated by conventional methods. In the preferred embodiments, this layer has taken several forms including a polyester fiber mat with the following qualities: random fiber positioning, open fiber weave, low-density, and flame-retardant. The second decoupling layer provides little or no attenuation to lower frequencies but rather serves to isolate, and reduce the resonance of, the principal energy-attenuating matrix layer. In extreme high-noise situations, this second layer may be augmented or replaced by the random or full coverage of a material which increases the effective mass/inertia of the resulting laminate. Weight penalties in either case are minimal and still provide a weight advantage over conventional low-frequency approaches.

EXAMPLES

Having described the present invention, the following examples are given to illustrate specific applications of the invention including the best mode now known to perform the invention. These specific examples are not intended to limit the scope of the invention described in this application.

Example 1

Laboratory measurements performed on various embodiments of this combination have shown a high-performance-to-weight ratio. In this example, the base polymer matrix was polyester and incorporated filler particles of differing acoustical impedances, high and low. The high-impedance filler was aluminum particles of random shape and varying in size from approximately 10-80 microns in their largest dimension; these occur in the composite matrix material in the proportion of five parts per hundred, by weight. The low-impedance filler was glass micro-balloons, spherical in shape and varying in size from approximately 10-80 microns in their largest dimension; these occur in the composite matrix material in the proportion of ten parts per hundred. This material, in laboratory measurements where artificial stiffness in the measurement method was introduced, produced 40+dB of acoustic attenuation.

Example 2

A silicone rubber material measuring approximately 0.20 inches in thickness and optimized in accordance with parameters set forth in the instant invention and U.S. Pat. No. 5,400,296 was affixed to one of three decoupling materials and placed on a vibrating surface to simulate a material mounted to a wall or floor containing structure-borne acoustical energy. Two of the decoupling matrices were urethane foams, one of which had been optimized and one which was unadulterated urethane. The third decoupler employed the teachings of the instant invention and was of a fibrous nature. The thickness of all the decouplers was approximately 0.25 inches. As can be seen from FIG. 11, at the lower frequencies of interest, the fiber decoupler yielded significantly better energy isolation than the two foam decouplers. At frequencies below 31.5 Hz, the non-optimized decoupler tended to provide slightly better isolation than the optimized foam. This tendency is supported by the fact that the optimized foam is based on the methods outlined in the instant invention and U.S. Pat. No. 5,400,296 where the goal is the optimal mismatching of characteristic acoustic impedances within the optimized composite and that "over-driving" an impedance mismatch results in harmonic and other distortions within the material.

DETAILED DESCRIPTION OF THE FIGURES

FIG. 1 shows a matrix material, 10, of the instant invention with embedded low characteristic acoustic impedance particles, 11 and a second, decoupling layer, 1. A preferred low characteristic acoustic impedance particle is a hollow glass micro sphere.

Figure 2:
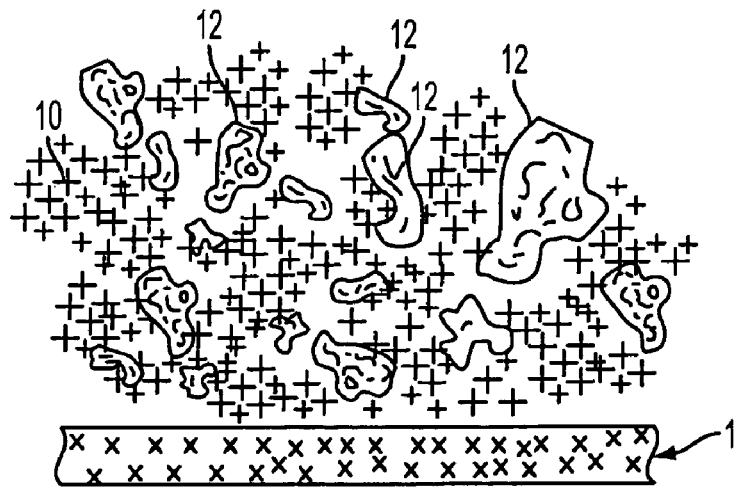
FIG. 2 shows a matrix material of the instant invention with a plurality of embedded high characteristic acoustic impedance particles.

FIG. 2 shows a matrix material, 10, of the instant invention with embedded high characteristic acoustic impedance particles, 12 and a second, decoupling layer, 1. A preferred high characteristic acoustic impedance particle is a metal.

Figure 3:
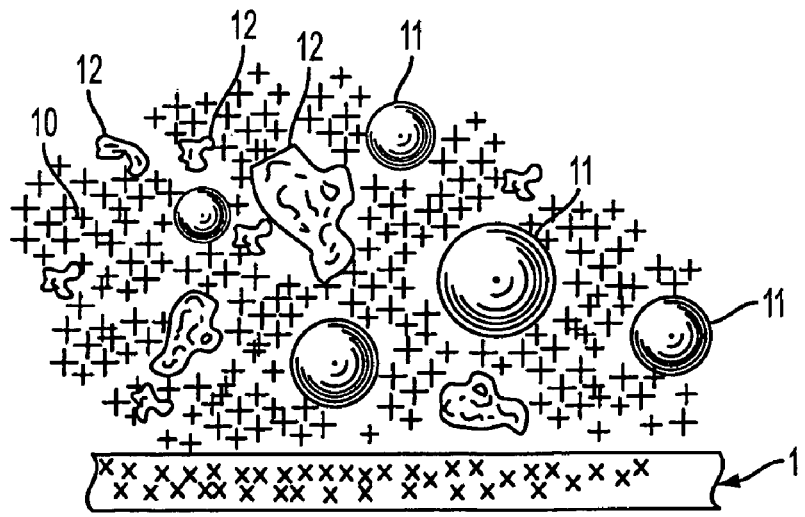
FIG. 3 shows a matrix material of the instant invention with a plurality of embedded low characteristic acoustic impedance particles and a plurality of embedded high characteristic acoustic impedance particles.

FIG. 3 shows a matrix material, 10, of the instant invention with embedded low characteristic acoustic impedance particles, 11, and embedded high characteristic acoustic impedance particles, 12. Also illustrated is a second, decoupling layer, 1.

FIGS. 4 through 10 present attenuation data gathered in accordance with the following method. The materials to be tested were formed or cast into rings of identical dimensions (except where noted) and then positioned so as to surround a sensing microphone mounted in a high mass flat plate coupler. Direct air-borne sound was prevented from reaching the microphone by a high mass, stainless steel cover which clamped the test ring in position. Attenuation measurements were taken in a semireverberant sound chamber using a pink noise source to produce a uniform sound pressure field of 120 dB (SPL). Samples were digitized and submitted to a Fast Fourier Transform procedure for analysis. Samples were 12 bit resolution, 8192 words in length and were collected at 50 kHz. Fifty samples were taken consecutively for each material tested and for an open microphone reference condition. After data collection and Fourier analysis all fifty samples were averaged binwise. Data from material samples were then subtracted from the reference data to obtain attenuation data. These results were verified using the alternative procedure of simply placing test materials over the aperture of the sensing microphone and collecting data samples.

Figure 4:
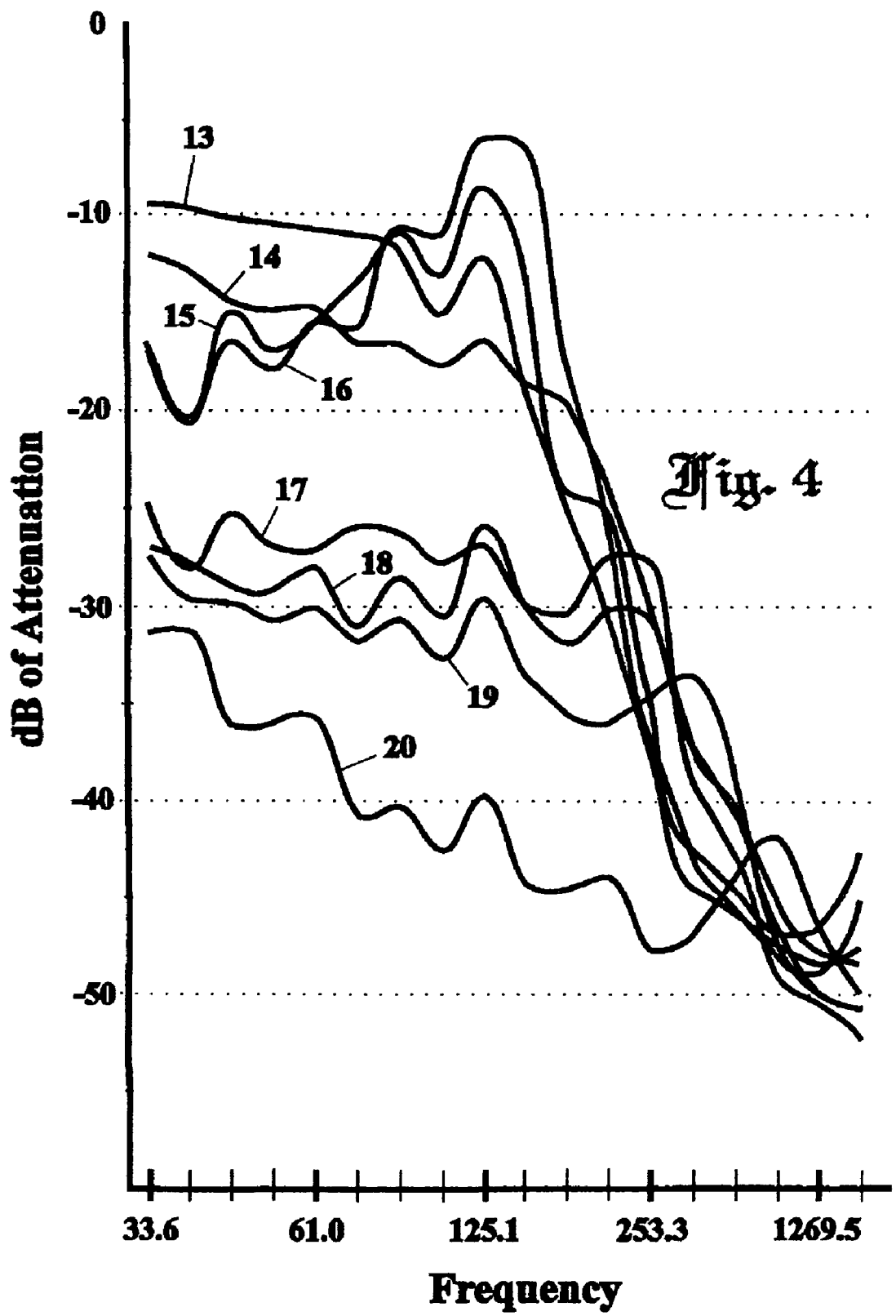
FIG. 4 is a graph showing the acoustic attenuation characteristic at a range of frequencies of two exemplary embodiments of the instant invention and the acoustic attenuation characteristic at a range of frequencies of several commercially available materials under the same conditions.

FIG. 4 shows the experimentally derived attenuation over a range of frequencies for several common materials and two exemplary embodiments of the instant invention. Material 13 is a widely used commercial acoustic absorbing material with a durometer of 30 A, a density of approximately 1.31 g/ml, and a test sample thickness of 5.84 mm. A second commercial acoustic absorbing material, 14, has a durometer of 50 A, a density of approximately 1.34 g/ml, and a test sample thickness of 3.43 mm. All other test materials used for the data shown in FIGS. 4 through 10 have a thickness of 4.70 mm. Other commercially available materials shown in FIG. 4 are: Dow Corning.RTM. Silastic.RTM. K RTV silicone rubber, 15 (durometer 50 A; density 1.26 g/ml); Dow Corning.RTM. Silastic.RTM. T RTV silicone rubber, 16 (durometer 35 A; density, 1.08 g/ml); Devcon.RTM. Flexane.RTM. 80 Liquid urethane, 17, (durometer 87 A; density, 1.09 g/ml); and Devcon.RTM. Flexane.RTM. 94 Liquid urethane, 19 (durometer, 97 A; density, 1.07 g/ml). Exemplary embodiments of the instant invention shown in FIG. 4 are: Silastic.RTM. T RTV silicone rubber with 4.0% by weight embedded glass micro spheres with diameters ranging from roughly 10 to roughly 100 microns and with 48.0% by weight embedded 99% pure lead particles with diameters ranging in size from roughly 5 to roughly 100 microns, 18, (density, 1.46 g/ml); and Devcon.RTM. Flexane.RTM. 94 Liquid urethane with 3.3% by weight embedded micro spheres with diameters ranging from roughly 10 to roughly 100 microns and with 33.8% by weight embedded 99% pure lead particles with diameters ranging from roughly 5 to roughly 100 microns, 20 (density, 1.28 g/ml).

FIG. 4, as is the case with succeeding figures, graphically displays attenuation data only for frequencies below 2000 Hz. This is because these frequencies have traditionally been the most difficult to attenuate and because differences in attenuation among materials are minimal above 2000 Hz.

The two commercial sound absorbing materials, 13, and 14, show very poor attenuation below 250 Hz but rapidly improve as 1000 Hz is approached. Their durometers are similar to the two RTV silicone rubbers shown, 15, and 16, but the silicone rubbers perform better at the very lowest frequencies. Materials with significantly greater durometers, the urethanes, 17 and 19, represent a significant improvement in sound attenuating abilities. This would be predicted given traditional teachings relating sound attenuation with material "hardness." What is of particular interest in FIG. 4 is the attenuation performances of the two embodiments, 18 and 20, of the instant invention.

Material 18 is a composite created according to the teachings of the instant invention and provides an additional 10-15 dB of attenuation over that of the matrix material alone. This represents a better than 150% improvement in acoustic energy attenuation and places this material in a class with much higher durometer materials while still retaining many desirable low durometer characteristics.

Material 20 is a composite created according to the teachings of the instant invention and provides an additional 2-10 dB of attenuation over that of the matrix material alone. This represents a 30%-150% improvement in acoustic energy attenuation. Tests of composites with high lead concentrations (up to 75%, not shown) did not attenuate acoustic energy as well as Material 20 and weighed up to 300% more.

Two Design Examples: A RTV Silicone Rubber and a Urethane Substrate

Particular implementations of the instant invention can be devised using the following procedure. In most cases a designer will begin with a consideration of the structural qualities of his desired product and work backwards from there. The structural requirements of a particular job may limit the choices to a particular class of materials. For example, a material may be required to withstand a moderately high heat, making the silicone rubbers desirable choices. Or the requirement may be for a light but effective material, making lead an undesirable ingredient. The instant invention disclosed herein allows the designer to begin a particular design by picking the matrix material of choice first and then enhancing that material to improve its acoustic properties with the addition of embedded high and/or low characteristic impedance particles.

To optimize the acoustic absorption and vibration damping of any given solid or elastomeric material, the designer should first pick the high and/or low characteristic acoustic impedance particles and the matrix material to be used. Generally, an extreme difference in characteristic acoustic impedance between high and low characteristic acoustic impedance particles and matrix material is preferred. The designer should then make several samples of the matrix material with different proportions of each particle type separately. He should test these samples using the same frequency ranges to which the end product will be subjected. He should then graph the results with separate graphs for samples containing each particle type. These graphs will show attenuation as a function of particle concentration at a selection of frequencies. The designer should then pick a concentration where the attenuation is best or has just begun to flatten out for each particle used, if possible, and use this concentration as the basis for calculating the concentration of mixed high and low characteristic acoustic impedance particles in the final matrix if more than one particle type is required. It may be found that the particles tested have little positive effect relative to deleterious properties. Lead particles in silicone rubber seem to be in this category, the increase in attenuation they provide may not be worth the increased weight.

The attenuating effect of embedding high characteristic acoustic impedance particles in a matrix material seems to be different than embedding low characteristic acoustic impedance particles in a matrix material. The acoustic attenuation from a combination of both high and low characteristic impedance particles is often much better than any practicable concentration of each individually. In the case of both Devcon.RTM. Flexane.RTM. 94 Liquid urethane and Silastic.RTM. T RTV used in our experiments the attenuating effect of glass micro spheres and lead particles is more than simply additive, a synergistic effect appears to be present.

RTV Silicone Rubber

Figure 5:
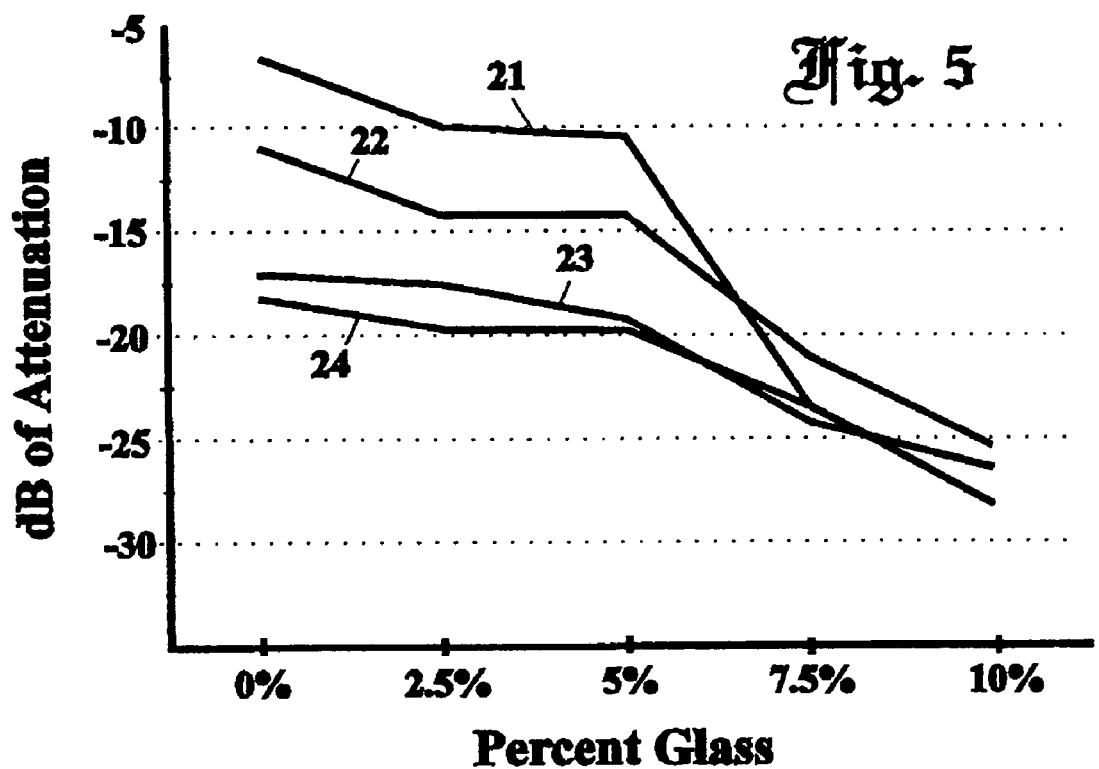
FIG. 5 is a graph showing the change in attenuation at several frequencies as the result of increasing proportions of low characteristic acoustic impedance particles embedded in an RTV (Room Temperature Vulcanizing) silicone substrate.

FIG. 5 shows attenuation as a function of concentration of glass micro spheres with diameters ranging from roughly 10 to roughly 100 microns embedded in Dow Corning.RTM. Silastic.RTM. T RTV for four frequencies. Glass micro spheres have a low characteristic acoustic impedance relative to Silastic.RTM. T RTV. All samples were cast in the same mold to the same physical size, and subjected to a high vacuum during casting to ensure gas removal. Line 21 shows attenuation at 253.3 Hz, line 22 shows attenuation at 125.1 Hz, line 23 shows attenuation at 33.6 Hz, and line 24 shows attenuation at 61.0 Hz. Embedding more than 10% by weight of glass micro spheres in Silastic.RTM. T is physically difficult so no data were collected beyond a 10% concentration. Inspection of FIG. 5 shows that attenuation has begun to negatively accelerate for most frequencies tested at a glass micro sphere concentration of 7.5%. A glass micro sphere concentration of 7.5% by weight in Silastic.RTM. T maintains good physical characteristics and leaves space within the matrix material for particles of other types.

Figure 6:
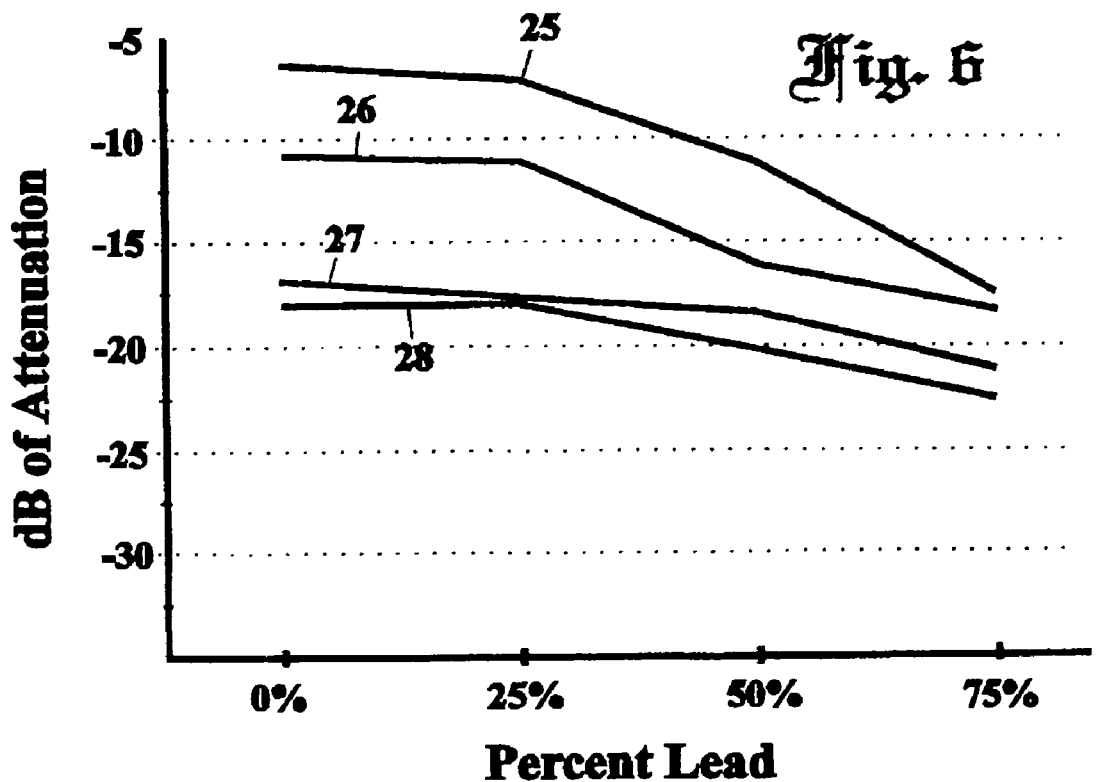
FIG. 6 is a graph showing the change in attenuation at several frequencies as the result of increasing proportions of embedded high characteristic acoustic impedance particles in an RTV silicone substrate.

FIG. 6 shows attenuation as a function of concentration of lead particles with diameters ranging from roughly 5 to roughly 100 microns embedded in Dow Corning.RTM. Silastic.RTM. T RTV for four frequencies. Lead particles have a high characteristic acoustic impedance relative to Silastic.RTM. T RTV. All samples were cast in the same mold to the same physical size and subjected to a high vacuum during casting to ensure gas removal. Line 25 shows attenuation at 253.3 Hz, line 26 shows attenuation at 125.1 Hz, line 27 shows attenuation at 33.6 Hz, and line 28 shows attenuation at 61.0 Hz. Embedding more than 75% by weight of lead particles in Silastic.RTM. T is physically difficult so no data were collected beyond a 75% concentration. Inspection of FIG. 6 shows that attenuation has begun to negatively accelerate for some frequencies tested at a lead particle concentration of 50%. A lead particle concentration of 50% by weight in Silastic.RTM. T maintains good physical characteristics and leaves space within the matrix material for particles of other types.

Figure 7:
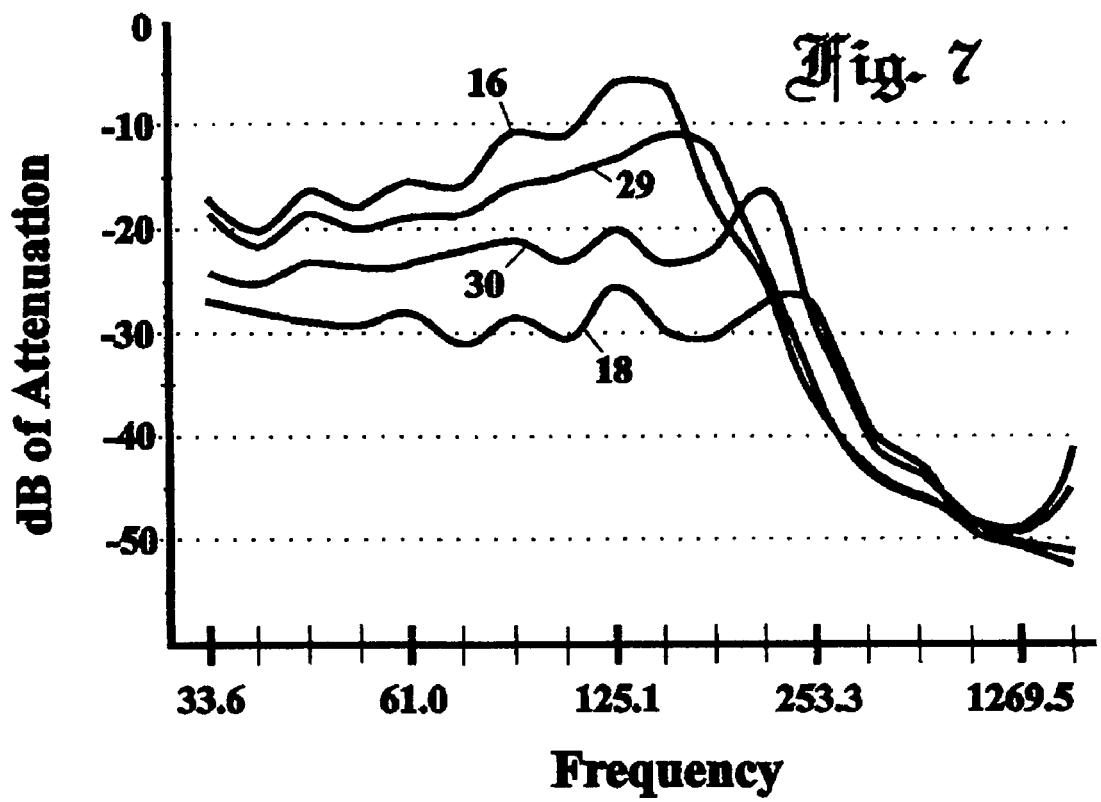
FIG. 7 is a graph showing the improvement in attenuation resulting from the teachings of the instant invention of an exemplary embodiment of the instant invention with an RTV silicone base.

FIG. 7 shows attenuation as a function of frequency for Dow Corning.RTM. Silastic.RTM. T RTV, 16; Dow Corning.RTM. Silastic.RTM. T RTV with 7.5% by weight embedded glass micro spheres with diameters ranging from roughly 10 to roughly 100 microns, 29; Dow Corning.RTM. Silastic.RTM. T RTV with 50% by weight embedded lead particles with diameters ranging from roughly 5 to roughly 100 microns, 30; and Dow Corning.RTM. Silastic.RTM. T RTV with 4.0% by weight embedded glass micro spheres with diameters ranging from roughly 10 to roughly 100 microns, and 48.0% by weight embedded lead particles with diameters ranging from roughly 5 to roughly 100 microns, 18. The proportions of 4% glass micro spheres, 48% lead particles, and 48% Silastic T matrix material are equivalent to the proportions of 7.5% glass micro spheres to matrix material and 50% lead particles to matrix material.

If the attenuation effect of high and low characteristic impedance particles simultaneously embedded in a matrix material were merely additive, then the attenuation curves 29 and 30 shown in FIG. 7 should add to curve 18, but clearly they do not. Curve 18 shows much more attenuation than the mere sum of curves 29 and 30, at least at the lower frequencies where improved attenuation is most desirable.

Urethane

Figure 8:
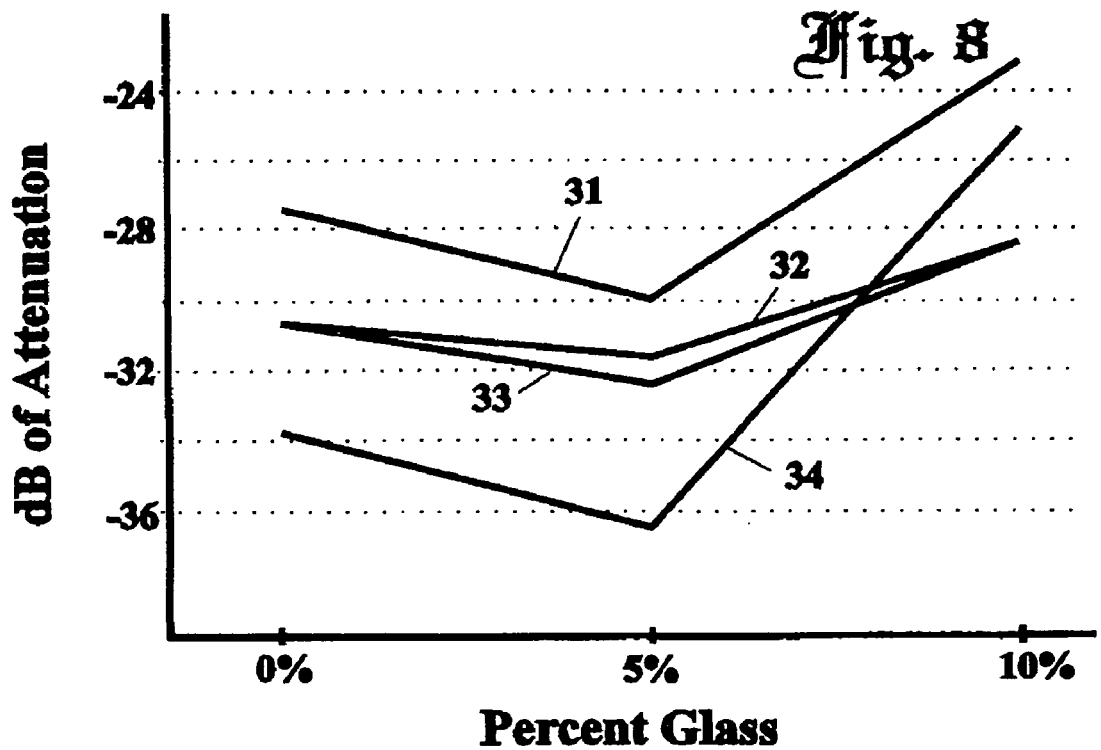
FIG. 8 is a graph showing the change in attenuation at several frequencies as the result of increasing proportions of low characteristic acoustic impedance particles embedded in a urethane substrate.

FIG. 8 shows attenuation as a function of concentration of glass micro spheres with diameters ranging from roughly 10 to roughly 100 microns embedded in Devcon.RTM. Flexane.RTM. 94 Liquid for four frequencies. Glass micro spheres have a low characteristic acoustic impedance relative to Flexane.RTM. 94 Liquid. All samples were cast in the same mold to the same physical size and subjected to a high vacuum during casting to ensure gas removal. Line 31 shows attenuation at 33.6 Hz, line 32 shows attenuation at 61.0 Hz, line 33 shows attenuation at 125.1 Hz, and line 34 shows attenuation at 253.3 Hz. Embedding more than 10% by weight of glass micro spheres in Flexane.RTM. 94 Liquid is physically difficult so no data were collected beyond a 10% concentration. Inspection of FIG. 8 shows that attenuation has reached a maximum for all frequencies tested at a glass micro sphere concentration of 5%. A glass micro sphere concentration of 5% by weight in Flexane.RTM. 94 Liquid maintains good physical characteristics and leaves space within the matrix material for particles of other types.

Figure 9:
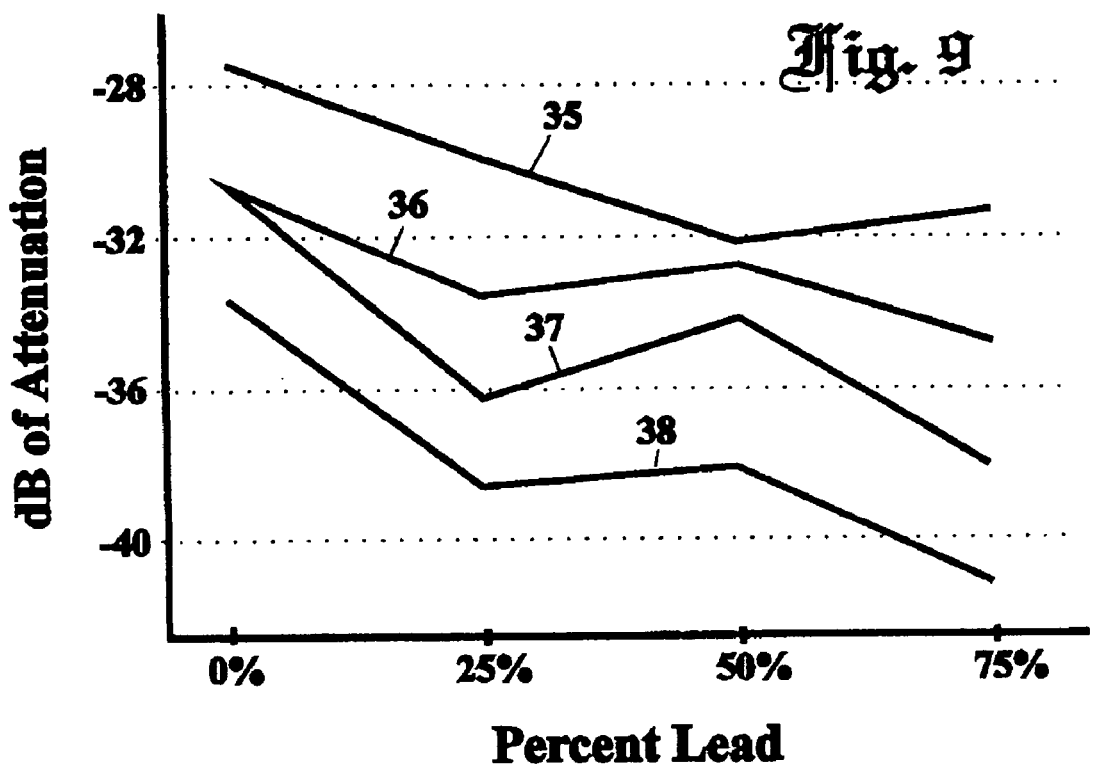
FIG. 9 is a graph showing the change in attenuation at several frequencies as the result of increasing proportions of high characteristic acoustic impedance particles embedded in a urethane substrate.

FIG. 9 shows attenuation as a function of concentration of lead particles with diameters ranging from roughly 5 to roughly 100 microns embedded in Devcon.RTM. Flexane.RTM. 94 Liquid for four frequencies. Lead particles have a high characteristic acoustic impedance relative to Flexane.RTM. 94 Liquid. All samples were cast in the same mold to the same physical size, and subjected to a high vacuum during casting to ensure gas removal. Line 35 shows attenuation at 33.6 Hz, line 36 shows attenuation at 61.0 Hz, line 37 shows attenuation at 125.1 Hz, and line 38 shows attenuation at 253.3 Hz. Embedding more than 75% by weight of lead particles in Flexane.RTM. 94 Liquid is physically difficult so no data were collected beyond a 75% concentration. Inspection of FIG. 9 shows that attenuation has begun to negatively accelerate for all frequencies tested at a lead particle concentration between 25% and 50%. A lead particle concentration of 35% by weight in Flexane.RTM. 94 Liquid was interpolated. This concentration maintains good physical characteristics and leaves space within the matrix material for particles of other types.

Figure 10:
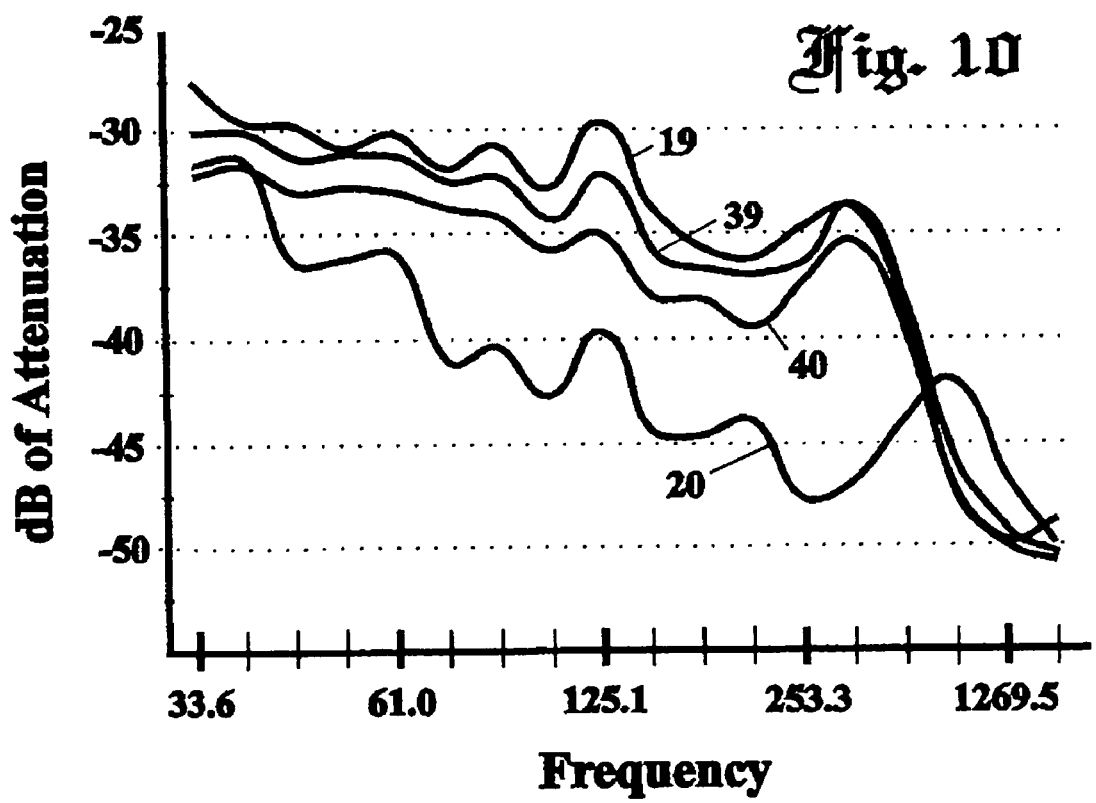
FIG. 10 is a graph showing the improvement in attenuation resulting from the teachings of the instant invention of an exemplary embodiment of the instant invention with a urethane base.

FIG. 10 shows attenuation as a function of frequency for Devcon.RTM. Flexane.RTM. 94 Liquid, 19; Flexane.RTM. 94 Liquid with 5% by weight embedded glass micro spheres with diameters ranging from roughly 10 to roughly 100 microns, 39; Flexane.RTM. 94 Liquid with 50% by weight embedded lead particles with diameters ranging from roughly 5 to roughly 100 microns, 40; and Flexane.RTM. 94 Liquid with 3.3% by weight embedded glass micro spheres with diameters ranging from roughly 10 to roughly 100 microns, and 33.8% by weight embedded lead particles with diameters ranging from roughly 5 to roughly 100 microns, 20. The proportions of 3.3% glass micro spheres, 33.8% lead particles, and 62.9% Flexane.RTM. 94 Liquid matrix material are equivalent to the proportions of 5% glass micro spheres to matrix material and 35% lead particles to matrix material.

If the attenuation effect of high and low characteristic impedance particles simultaneously embedded in a matrix material were merely additive, then the attenuation curves 39 and 40 shown in FIG. 10 should add to curve 20, but clearly they do not. Curve 20 shows much more attenuation than the mere sum of curves 39 and 40 at many of the tested frequencies.

Figure 11:
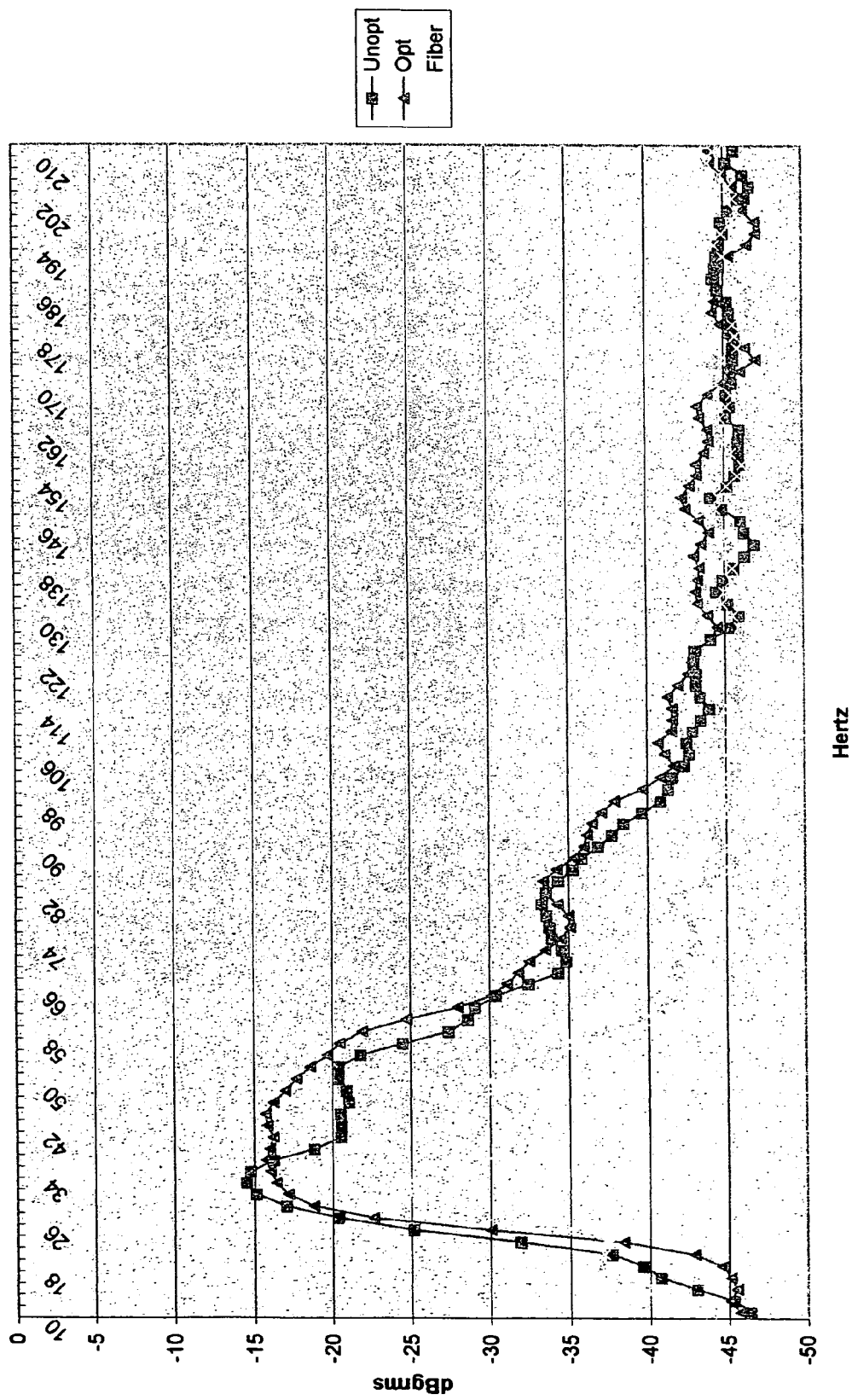
FIG. 11 is a graph illustrating the accoustic energy isolation provided by the instant invention when compared to two traditional methods.

FIG. 11 illustrates the acoustical energy isolation provided by the instant invention when compared to two traditional methods. A silicone rubber material measuring approximately 0.20 inches in thickness and optimized in accordance with parameters set forth in the instant invention and U.S. Pat. No. 5,400,296 was affixed to one of three decoupling materials and placed on a vibrating surface to simulate a material mounted to a wall or floor containing structure-borne acoustical energy. Two of the decoupling matrices were urethane foams, one of which had been optimized and one that was unadulterated urethane. The third decoupler employed the teachings of the instant invention and was of a fibrous nature. The thickness of all the decouplers was approximately 0.25 inches. As can be seen from FIG. 11, at the lower frequencies of particular interest, the fiber decoupler yielded significantly better energy isolation than the two foam decouplers. At frequencies below 31.5 Hz, the non-optimized decoupler tended to provide slightly better isolation than the optimized foam. This tendency is supported by the fact that the optimized foam is based on the methods outlined in the instant invention and U.S. Pat. No. 5,400,296 where the goal is the optimal mismatching of characteristic acoustic impedances within the optimized composite and that "over-driving" an impedance mismatch results in harmonic and other distortions within the material.

Many different materials can be made more vibration and acoustic energy attenuating using the teachings of the instant invention. Application of these materials covers a very wide range of possibilities including the opportunity to optimize a particular material for sound attenuation while maintaining good structural and weight characteristics. Ear protection cups may be improved. Interior panels in automobiles and airplanes can be made more sound attenuating. Building materials from roof coatings to room isolation and structural panels are also possibilities. Heavy machinery can be more effectively isolated from surrounding structures. Submarines, which depend on stealth for survival, can be made much more silent.

Many modifications and variations of the present invention are possible in light of the above teachings. Thousands of materials are available from which to make high and low characteristic acoustic impedance particles, and thousands of materials can serve as matrix materials in the instant invention, including most polymers, elastomers and solid petroleum extracts as well as such conventional building materials as gypsum board and composition blocks and panels. Likewise, many materials can be used to make the decoupling layer, including silicone, natural fiber, polyester, urethane, fiberglass, any other man-made plastic, plastic-like or fiber material. It is therefore to be understood that, within the scope of the appended claims, the instant invention may be practiced otherwise than as specifically described.

What is claimed is:

1. An acoustic attenuation and vibration damping material comprising:

a first layer of a matrix material with a plurality of at least two species of particles incorporated therein, said particles being species differentiated by their characteristic acoustic impedances, and said particle species being proportionally distributed in said matrix material so that an increase in acoustic attenuating and vibration damping effect of said matrix material with said combination of at least two species of particles incorporated therein, relative to the acoustic attenuating and vibration damping effect of said matrix material with no particles incorporated therein, is greater than the sum of increases in acoustic attenuating and vibration damping effects of each particle species incorporated individually at the same concentration in said matrix material, relative to the acoustic attenuating and vibration damping effect of said matrix material with no particles incorporated therein, and a second layer of decoupling material that is at least partially in physical contact with said first layer, wherein said physical contact between said first layer and said second layer comprises less than ten percent of the surface area of said first layer.

2. The acoustic attenuation and vibration damping material of claim 1, wherein said second layer of decoupling material is comprised of an open-weave, low-density mat consisting of an inorganic fibrous material.

3. The acoustic attenuation and vibration damping material of claim 2, wherein said mat is composed of material selected from the group consisting of an organic polymer, an inorganic polymer, a polyester type material, a urethane type material, a silicone rubber type material, a natural fiber material, fiberglass, a composite fiber type material, and combinations thereof.

4. The acoustic attenuation and vibration damping material of claim 2, wherein said mat has flame-retardent qualities.

5. The acoustic attenuation and vibration damping material of claim 2, wherein said mat is a urethane type material.

6. The acoustic attenuation and vibration damping material of claim 1, wherein said matrix material is a urethane type material.

7. The acoustic attenuation and vibration damping material of claim 1, wherein said matrix material is a silicone rubber type material.

8. The acoustic attenuation and vibration damping material of claim 1, wherein said matrix material is an elastomer.

9. The acoustic attenuation and vibration damping material of claim 1, wherein said matrix material is a polymer.

10. The acoustic attenuation and vibration damping material of claim 1, wherein said matrix material is a petroleum extract.

11. The acoustic attenuation and vibration damping material of claim 1, wherein said matrix material is gypsum.

12. The acoustic attenuation and vibration damping material of claim 1, wherein one of said particle species is lead.

13. The acoustic attenuation and vibration damping material of claim 1, wherein one of said species of particles is of low impedance and another of said species of particles is of high impedance.

14. The acoustic attenuation and vibration damping material of claim 13, wherein said low impedance particle is cork and where said high impedance particle is steel.

15. The acoustic attenuation and vibration damping material of claim 1, wherein one of said particle species is glass micro spheres.

16. The acoustic attenuation and vibration damping material of claim 1, wherein one of said particle species is aluminum.

17. The acoustic attenuation and vibration damping material of claim 1, wherein one of said particle species is cork.

18. The acoustic attenuation and vibration damping material of claim 1, wherein said physical contact further comprises adherence of said second layer of decoupling material to said first layer.

19. The acoustic attenuation and vibration damping material of claim 18, wherein said commercially available adhesive is a type of epoxy cement.

20. The acoustic attenuation and vibration damping material of claim 18, wherein said commercially available adhesive is a type of non-corrosive glue.

21. The acoustic attenuation and vibration damping material of claim 1, wherein said first layer is adhered o said second layer by an adhesive between said first layer and said second layer.

22. The acoustic attenuation and vibration damping material of claim 1, wherein said adherence of said first layer to said second layer is accomplished by means of applying sufficient heat so tat the layers become at least partially physically connected.

23. A method of providing acoustic attenuation comprising reducing the sympathetic vibration between a substrate and sound attenuation materials by inserting a decoupling layer between said substrate and said sound attenuation material, wherein the sound attenuation material is comprised of the two layer acoustic attenuation and vibration damping material of claim 1.

24. The method of claim 23, wherein said second layer of decoupling material is comprised of an open-weave, low density mat consisting of an inorganic fibrous material.

25. The method of claim 23, wherein said sound attenuation material is adhered to said decoupling layer by an adhesive between said attenuation material and said decoupling layer.

26. The method of claim 23, wherein said matrix material is a polymer.

27. The method of claim 23, wherein one of said species of particles is of low impedance and another of said species of particles is of high impedance.

28. The method of claim 27, wherein said low impedance particle is cork and where said high impedance particle is steel.

* * * * *